(12) United States Patent
Lundgren et al.

(10) Patent No.: US 10,904,493 B2
(45) Date of Patent: Jan. 26, 2021

(54) FILTER ALIGNMENT FOR MULTI-SPECTRAL COMPOSITE IMAGE

(71) Applicant: THE BOEING COMPANY, Chicago, IL (US)

(72) Inventors: Mark A. Lundgren, Fullerton, CA (US); Friedrich Wilhelm Kunzler, Hacienda Heights, CA (US); Maurice Masequesmay, Huntington Beach, CA (US)

(73) Assignee: THE BOEING COMPANY, Chicago, IL (US)

(*) Notice: Subject to any disclaimer, the term of this patent is extended or adjusted under 35 U.S.C. 154(b) by 0 days.

(21) Appl. No.: 16/373,174

(22) Filed: Apr. 2, 2019

(65) Prior Publication Data

US 2020/0322581 A1 Oct. 8, 2020

(51) Int. Cl.

| H04N 9/083 | (2006.01) |
| H04N 5/33 | (2006.01) |
| H04N 9/04 | (2006.01) |
| H04N 5/32 | (2006.01) |

(52) U.S. Cl.
CPC ............ *H04N 9/083* (2013.01); *H04N 5/32* (2013.01); *H04N 5/332* (2013.01); *H04N 9/0455* (2018.08); *H04N 9/04521* (2018.08)

(58) Field of Classification Search
None
See application file for complete search history.

(56) References Cited

U.S. PATENT DOCUMENTS

| 5,475,428 | A | * | 12/1995 | Hintz | ................... G06T 3/4015 348/263 |
| 6,714,240 | B1 | | 3/2004 | Caswell | |
| 7,420,678 | B2 | | 9/2008 | Lundgren et al. | |
| 8,154,611 | B2 | | 4/2012 | Lundgren | |
| 8,295,578 | B2 | | 10/2012 | Lundgren et al. | |
| 8,964,047 | B2 | | 2/2015 | Robinson et al. | |
| 9,646,388 | B2 | | 5/2017 | Paxton et al. | |

(Continued)

OTHER PUBLICATIONS

Wikipedia, "Bayer Filter," <https://en.wikipedia.org/wiki/Bayer_filter> retrieved Apr. 1, 2019, 4 pgs.

(Continued)

*Primary Examiner* — Talha M Nawaz
(74) *Attorney, Agent, or Firm* — Moore IP Law

(57) ABSTRACT

A method includes capturing, with an image capture device, a first image of a scene while a portion of the scene has a first alignment with a first detector of a focal plane array and a first bandpass filter is between the portion of the scene and the first detector. The method includes, in response to determining that the portion of the scene has a second alignment with a second detector of the focal plane array, the second alignment substantially matching the first alignment, and that a second bandpass filter having a second frequency range that is distinct from a first frequency range of the first bandpass filter is between the portion of the scene and the second detector, initiating storage of a second image of the scene, the second image captured while the portion of the scene has the second alignment with the second detector.

23 Claims, 10 Drawing Sheets

(56) References Cited

U.S. PATENT DOCUMENTS

| | | | | |
|---|---|---|---|---|
| 2006/0007547 A1* | 1/2006 | Kamikawa | ............. | G02B 5/288 |
| | | | | 359/589 |
| 2011/0242328 A1* | 10/2011 | Twede | ..................... | H04N 5/33 |
| | | | | 348/164 |
| 2012/0325912 A1* | 12/2012 | Wang | ....................... | G06K 7/12 |
| | | | | 235/462.06 |
| 2017/0074640 A1* | 3/2017 | Cable | ................. | G01B 9/02007 |
| 2018/0176488 A1* | 6/2018 | Dvir | ..................... | G02B 13/146 |
| 2018/0184015 A1* | 6/2018 | Richarte | ............. | H04N 5/2355 |

OTHER PUBLICATIONS

U.S. Appl. No. 16/373,174, filed Apr. 2, 2019, Mark A. Lundgren.
Extended European Search Report for Application No. 19217870.5 dated Jun. 17, 2020, 8 pgs.

\* cited by examiner

400

402

Capture, at an image device, a first image of a scene while a particular portion of the scene has a first alignment with a first detector of a focal plane array and a first bandpass filter is between the particular portion of the scene and the first detector

404

In response to determining that the particular portion of the scene has a second alignment with a second detector of the focal plane array, the second alignment substantially matching the first alignment, and that a second bandpass filter having a second frequency range that is distinct from a first frequency range of the first bandpass filter is between the particular portion of the scene and the second detector, initiate storage of a second image of the scene, the second image captured while the particular portion of the scene has the second alignment

406

Generate a multi-spectral composite image using at least the first image and the second image

*FIG. 4*

FILTER ALIGNMENT FOR MULTI-SPECTRAL COMPOSITE IMAGE

FIELD OF THE DISCLOSURE

The present disclosure is related to multi-spectral imaging.

BACKGROUND

Imaging systems can be used to determine one or more characteristics of an object. The one or more characteristics of the object can include color characteristics of the object, heat characteristics of the object, etc. As a non-limiting example of determining color characteristics of an object, a video imaging system, such as a video camera, can utilize three filters (e.g., a red filter, a green filter, and a blue filter) that are placed over pixels (e.g., detectors) in a focal plane to capture a particular object in a scene. Each filter can be used to generate a corresponding image (e.g., a red image, a green image, and a blue image) that is used to generate a composite image of the scene. However, if the object or a portion of interest of the object is smaller than a pixel, or a small number of pixels, it may not be possible to recreate an accurate spectrum (e.g., a set of measurements of power versus frequency) using a conventional video camera. Thus, in scenarios where images of objects are captured from a distance (e.g., captured from space) such that a small number of pixels are used to capture data corresponding to the object, decreased spectral resolution may result.

SUMMARY

According to one implementation of the present disclosure, an image capture device includes a filter device, a focal plane array, and an image controller coupled to the filter device and the focal plane array. The filter device includes at least a first bandpass filter having a first frequency range and a second bandpass filter having a second frequency range that is distinct from the first frequency range. The focal plane array includes a plurality of detectors. The image controller is configured to initiate capture of a first image of a scene while a particular portion of the scene has a first alignment with a first detector of the focal plane array and the first bandpass filter is between the particular portion of the scene and the first detector. The image controller is also configured to initiate storage of a second image of the scene in response to determining that the particular portion of the scene has a second alignment with a second detector of the focal plane array, that the second alignment substantially matches the first alignment (e.g., shifted by an integral multiple of pixel spacing), and that the second bandpass filter is between the particular portion of the scene and the second detector. The second image is captured while the particular portion of the scene has the second alignment with the second detector. The image controller is also configured to generate a multi-spectral composite image using at least the first image and the second image.

According to another implementation of the present disclosure, a method of capturing image data includes capturing, with an image capture device, a first image of a scene while a particular portion of the scene has a first alignment with a first detector of a focal plane array and a first bandpass filter is between the particular portion of the scene and the first detector. The method also includes, in response to determining that the particular portion of the scene has a second alignment with a second detector of the focal plane array, that the second alignment substantially matches the first alignment, and that a second bandpass filter has a second frequency range that is distinct from a first frequency range of the first bandpass filter is between the particular portion of the scene and the second detector, initiating storage of a second image of the scene. The second image is captured while the particular portion of the scene has the second alignment with the second detector. The method further includes generating a multi-spectral composite image using at least the first image and the second image.

According to another implementation of the present disclosure, a computer-readable storage device stores instructions that, when executed by an image controller of an image capture device, cause the image controller to perform operations including initiating capture of a first image of a scene while a particular portion of the scene has a first alignment with a first detector of a focal plane array and a first bandpass filter is between a particular portion of the scene and the first detector. The operations also include, in response to determining that the particular portion of the scene has a second alignment with a second detector of the focal plane array, that the second alignment substantially matches the first alignment, and that a second bandpass filter has a second frequency range that is distinct from a first frequency range of the first bandpass filter is between the particular portion of the scene and the second detector, initiating storage of a second image of the scene. The second image is captured while the particular portion of the scene has the second alignment with the second detector. The operations further include generating a multi-spectral composite image using at least the first image and the second image.

Additionally, the features, functions, and advantages that have been described can be achieved independently in various implementations or may be combined in yet other implementations, further details of which are disclosed with reference to the following description and drawings.

BRIEF DESCRIPTION OF THE DRAWINGS

FIG. 4 is a flowchart of a method for controlling an alignment of a filter device to generate a multi-spectral composite image;

DETAILED DESCRIPTION

Figure 1A:
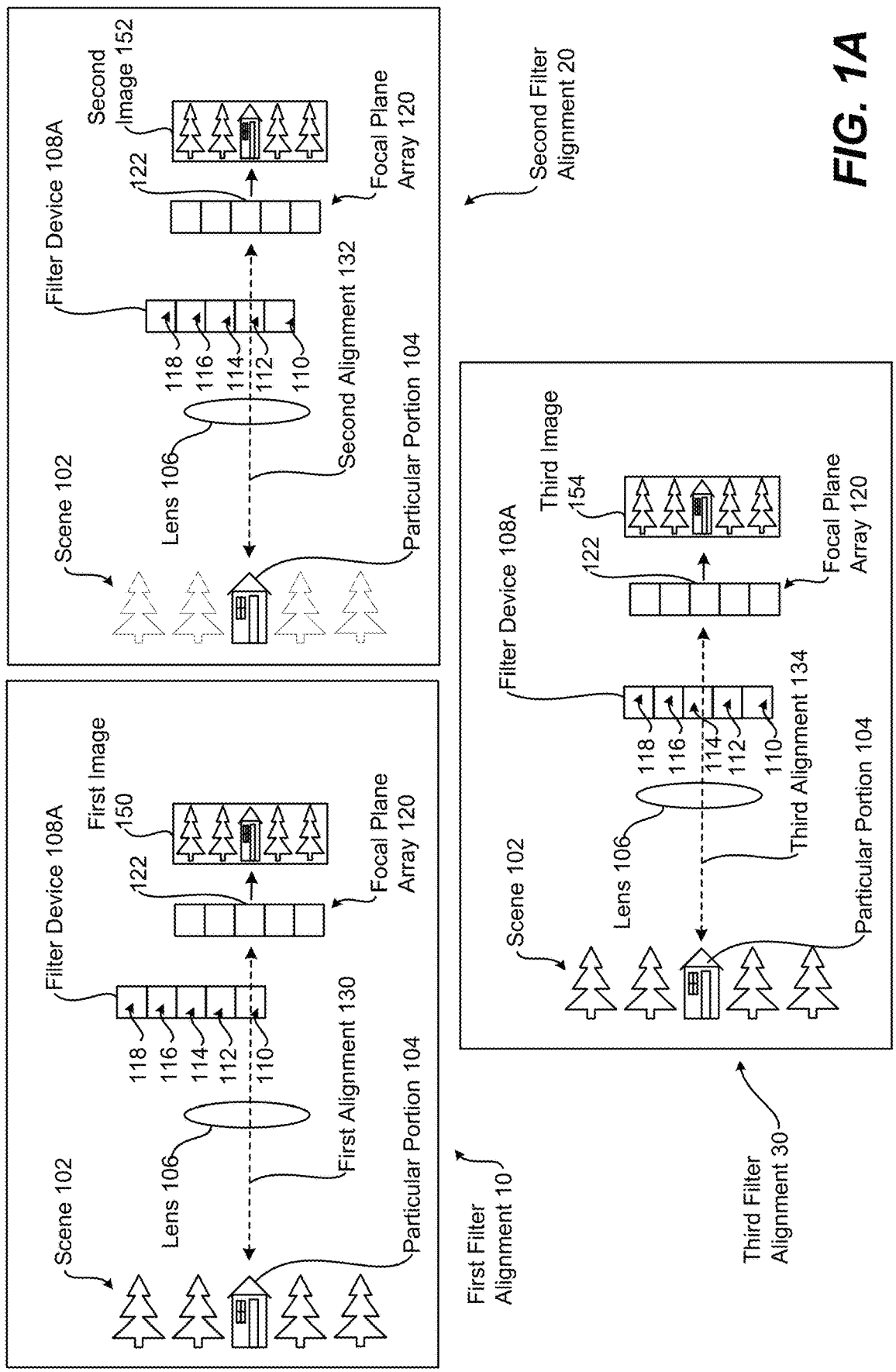
FIG. 1A is a diagram of an example of controlling an alignment of a filter device to generate multiple aligned images having different spectral qualities.

Particular embodiments of the present disclosure are described below with reference to the drawings. In the description, common features are designated by common reference numbers throughout the drawings.

The figures and the following description illustrate specific exemplary embodiments. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

In some drawings, multiple instances of a particular type of feature are used. Although these features are physically and/or logically distinct, the same reference number is used for each, and the different instances are distinguished by addition of a letter to the reference number. When the features as a group or a type are referred to herein (e.g., when no particular one of the features is being referenced), the reference number is used without a distinguishing letter. However, when one particular feature of multiple features of the same type is referred to herein, the reference number is used with the distinguishing letter. For example, multiple filter devices are illustrated and associated with reference numbers 108A, 108B, etc. When referring to a particular one of these filter devices, such as the filter device 108A, the distinguishing letter "A" is used. However, when referring to any arbitrary one of these filter devices or to these filter devices as a group, the reference number 108 is used without a distinguishing letter.

As used herein, various terminology is used for the purpose of describing particular implementations only and is not intended to be limiting. For example, the singular forms "a," "an," and "the" are intended to include the plural forms as well, unless the context clearly indicates otherwise. Further, the terms "comprise," "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

As used herein, "generating", "calculating", "using", "selecting", "accessing", and "determining" are interchangeable unless context indicates otherwise. For example, "generating", "calculating", or "determining" a parameter (or a signal) can refer to actively generating, calculating, or determining the parameter (or the signal) or can refer to using, selecting, or accessing the parameter (or signal) that is already generated, such as by another component or device. As used herein, "coupled" can include "communicatively coupled," "electrically coupled," or "physically coupled," and can also (or alternatively) include any combinations thereof. Two devices (or components) can be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled can be included in the same device or in different devices and can be connected via electronics, one or more connectors, or inductive coupling, as illustrative, non-limiting examples. In some implementations, two devices (or components) that are communicatively coupled, such as in electrical communication, can send and receive electrical signals (digital signals or analog signals) directly or indirectly, such as via one or more wires, buses, networks, etc. As used herein, "directly coupled" is used to describe two devices that are coupled (e.g., communicatively coupled, electrically coupled, or physically coupled) without intervening components.

According to the techniques described herein, an image capture device includes a filter device and a focal plane array. In some implementations, movement of the filter device, the focal plane array, or both, is controlled with respect to a scene being captured such that detectors responsive to one color band (e.g., receiving light through a particular color filter), in one image, sample nearly the same space of the scene as detectors responsive to other color bands in other images. In some implementations, movement of the focal plane array and filter relative to the scene is tracked, such as movement due to motion of the image capture device, motion of a vehicle that carries the image capture device (e.g., an aircraft or satellite), or motion due to hand jitter when the image capture device is implemented in a hand-held device. Image capture timing can be determined, based on the tracked motion, so that detectors responsive to one color band in one image sample nearly the same space of the scene as detectors responsive to other color bands in other images. In some implementations, multiple images are taken with varying alignments, such as in an automatic multi-image capture operation, and the images that are determined, based on the tracked motion, to have detectors sampling nearly the same space in the scene but responsive to different color bands are saved and used to generate a composite image. The other images (that are determined to not have detectors sampling nearly the same space in the scene) are discarded.

One advantage of the above-described implementations is improved spectral resolution of a composite image by capturing multiple images that are characterized by a substantially similar alignment between an object and detectors of a focal plane array, with each image taken using a different bandwidth filter configuration, so that a particular feature of the object is sampled though a different bandwidth filter (e.g., color filter) in each of the multiple images. As an example, a feature that is centered in an instantaneous field of view of a detector and/or filter in one of the images and sampled using a first color filter is also substantially centered in the field of view of the detector (or centered in the field of view of other detectors) in the rest of the images but sampled using different color filters. As a result, a relatively large number of images having similar alignments with respect to detectors of the focal plane array but different filtering can be captured and processed to increase a spectral resolution of the composite image.

FIG. 1A is a diagram of an example of controlling alignment of a filter device to generate multiple aligned images having different spectral qualities. For example, according to the techniques described in FIG. 1A, a first filter alignment 10 is used to generate a first image 150 having first spectral qualities, a second filter alignment 20 is used to generate a second image 152 having second spectral qualities, and a third filter alignment 30 is used to generate a third image 154 having third spectral qualities. The filter alignment techniques described below can be extended to generate additional images having different spectral qualities.

As used herein, "spectral qualities" of an image include associations of frequency ranges with the pixels of the image. For example, a traditional Bayer-type mosaic filter has a 2×2 filter pattern with two green filters, one red filter, and one blue filter, so that a 2×2 group of detectors aligned with the filter pattern includes a first detector and a third detector that measure the intensity of green light that is received through the respective green filters, a second detector that measures the intensity of red light that is received through the red filter, and fourth detector that measures the intensity of blue light that is received through the blue filter. The measured values of the first and third detector correspond to green values of first and third pixels in a resulting image, the measured value of the second detector corresponds to a red value of a second pixel in the resulting image, and the measured value of the fourth detector corresponds to a blue value of a fourth pixel in the resulting image. As used herein, a "pixel" is a unit of an image and is associated with one or more intensity values for different frequency bands, such as a red value, a green value, and a blue value in some implementations that use visible light. A size of a pixel in an image can represent a corresponding physical size of a detector or filter that is used to capture the portion of the scene that is represented by the pixel in the image.

The first image 150, the second image 152, and the third image 154 are images of a scene 102. In the illustrated example of FIG. 1A, the scene 102 includes four trees and a house. It should be understood that the illustrated scene 102 in FIG. 1A is merely for illustrative purposes and should not be construed as limiting. As described below, a particular portion 104 (e.g., the house) of the scene 102 is used as a reference point to perform the filter alignment techniques described herein. The filter alignment techniques described with respect to FIG. 1A are implemented using a lens 106, a filter device 108A, and a focal plane array 120. As described with respect to FIG. 2, an image controller is operable to control motion and positions of one or more of the lens 106, the filter device 108A, and the focal plane array 120 to implement the filter alignment techniques described herein.

As used herein, a "filter device" is a device that includes multiple bandpass filters and that is configured to interpose one or more of the bandpass filters between a scene and one or more detectors of a focal plane array. As used herein, a "bandpass filter" is a device or material configured to pass electromagnetic radiation having frequencies within a frequency range (a "passband") and to block electromagnetic radiation having frequencies outside the frequency range. A "detector" is any device configured to measure an intensity of received electromagnetic radiation and to generate an output value that indicates the measured value, such as, for example, a photosensor. "Electromagnetic radiation" can refer to photons having frequencies in any portion of the electromagnetic spectrum, such as radio, microwave, far infrared, near infrared, visible light, ultraviolet, x-rays, gamma rays, or any combination thereof. A "focal plane array" is a collection of detectors (e.g., in a rectangular array, a hexagonal array, or another regular or irregular arrangement of detectors) configured to measure intensity of received electromagnetic radiation and placed to receive an image of a scene of interest, such as at a focal plane of an image capture device.

The filter device 108A includes a filter array (e.g., an arrangement of band pass filters, such as a Bayer-type mosaic filter, as an illustrative, non-limiting example). The filter device 108A includes a first bandpass filter 110 having a first frequency range, a second bandpass filter 112 having a second frequency range, a third bandpass filter 114 having a third frequency range, a fourth bandpass filter 116 having a fourth frequency range, and a fifth bandpass filter 118 having a fifth frequency range. Although five bandpass filters 110-118 are illustrated in FIG. 1A, in other implementations, the filter device 108A can include additional (or fewer) bandpass filters. For example, in one implementation, the filter device 108A can include eight bandpass filters. As another example, the filter device 108A can include four bandpass filters. It should be understood that although five bandpass filters 110-118 having distinct frequency ranges are illustrated, the bandpass filters 110-118 are repeated using the illustrated pattern such that the filter device 108A includes relatively large number of the five bandpass filters 110-118.

In some implementations, the frequency ranges of the corresponding bandpass filters 110-118 allow different colors of light to pass. To illustrate, the first frequency range (e.g., the passband) of the first bandpass filter 110 can be associated with a first color, the second frequency range of the second bandpass filter 112 can be associated with a second color that is different from the first color, etc. According to one implementation, the first frequency range of the first bandpass filter 110 spans between 430 terahertz (THz) and 480 THz, and the first color associated with the first frequency range is red. According to one implementation, the second frequency range of the second bandpass filter 112 spans between 540 THz and 580 THz, and the second color associated with the second frequency range is green. According to one implementation, the third frequency range of the third bandpass filter 114 spans between 610 THz and 670 THz, and a third color associated with the third frequency range is blue. According to one implementation, the fourth frequency range of the fourth bandpass filter 116 spans between 480 THz and 510 THz, and a fourth color associated with the fourth frequency range is orange. According to one implementation, the fifth frequency range of the fifth bandpass filter 118 spans between 510 THz and 540 THz, and a fifth color associated with the fifth frequency range is yellow. It should be understood that the frequency ranges identified above and the corresponding color associations are merely for illustrative purposes and should not be construed as limiting.

According to the illustration of the first filter alignment 10, the first bandpass filter 110 is aligned between the particular portion 104 of the scene 102 and a first detector 122 of the focal plane array 120. For example, a line indicative of a first alignment 130 intersects the particular portion 104 of the scene 102, the lens 106, the first bandpass filter 110, and the first detector 122 of the focal plane array 120. As a result, electromagnetic radiation corresponding to the particular portion 104 of the scene 102 that reaches the first bandpass filter 110 is filtered to pass the first frequency range (e.g., 430 THz-480 THz) and to block frequencies outside the first frequency range such that, when the first image 150 is captured, a corresponding pixel (e.g., a pixel having a value based on the measured intensity value of the first detector 122 of the focal plane array 120) in the first image 150 includes data indicating an intensity of electromagnetic radiation received at the first detector 122 (e.g., an intensity of red light associated with the particular portion 104 and received at the first detector 122). Other pixels in the first image 150 include data indicating an intensity of electromagnetic radiation received at other detectors in the focal plane array 120, after the electromagnetic radiation has been filtered through a corresponding bandpass filter of the filter device 108A. Thus, the image 150 includes multiple pixels, each pixel having a single pixel value (e.g., a value indicating a red component of the pixel, a green component of the pixel, a blue component of the pixel, an orange component of the pixel, or a yellow component of the pixel, depending on which of the bandpass filters 110-118 filtered the received electromagnetic radiation for the portion of the scene 102 corresponding to that pixel).

According to the illustration of the second filter alignment 20, the second bandpass filter 112 is aligned between the particular portion 104 of the scene 102 and the first detector 122 of the focal plane array 120. For example, a line indicative of a second alignment 132 intersects the particular portion 104 of the scene 102, the lens 106, the second bandpass filter 112, and the first detector 122 of the focal plane array 120. Thus, one or more component (e.g., the lens 106, the filter device 108A, or the focal plane array 120) is adjusted such that particular portion 104 of the scene 102 is aligned with the second bandpass filter 112 in substantially the same manner as the particular portion 104 of the scene 102 was aligned with the first bandpass filter 110 in the first filter alignment 10. For example, the one or more component is adjusted based on a physical dimension or size (e.g., a "filter size") of an individual bandpass filter 110-118 such that the second alignment 132 substantially matches (e.g., is displaced by an integral multiple of pixel spacings in two dimensions, within an error of ¼ of a pixel spacing, or alternatively within an error of ¹⁄₁₀ of a pixel spacing) the first alignment 130. To illustrate, the filter device 108A is shifted downwards by a distance matching the physical size of an individual bandpass filter 110-118 to achieve the second filter alignment 20. As a result, the particular portion 104 of the scene 102 is filtered through the second frequency range (e.g., 540 THz-580 THz) such that, when the second image 152 is captured, a corresponding pixel (to the first detector 122 of the focal plane array 120) in the second image 152 includes data indicating an intensity of green light associated with the particular portion 104 and received at the first detector 122. The second image 152 depicts other portions of the scene 102 in colors corresponding to alignments with the other bandpass filters 110, 114, 116, 118.

According to the illustration of the third filter alignment 30, the third bandpass filter 114 is aligned between the particular portion 104 of the scene 102 and the first detector 122 of the focal plane array 120. For example, a line indicative of a third alignment 134 intersects the particular portion 104 of the scene 102, the lens 106, the third bandpass filter 114, and the first detector 122 of the focal plane array 120. Thus, one or more component (e.g., the lens 106, the filter device 108A, or the focal plane array 120) is adjusted such that particular portion 104 of the scene 102 is aligned with the third bandpass filter 114 in substantially the same manner as the particular portion 104 of the scene 102 was aligned with the second bandpass filter 112 in the second filter alignment 20. For example, the one or more component is adjusted based on a physical size of an individual bandpass filter 110-118 such that the third alignment 134 substantially matches (e.g., is within a degree of freedom) of the other alignments 130, 132. To illustrate, the filter device 108A is shifted downwards by a distance that matches the physical size of an individual bandpass filter 110-118 (e.g., an edge-to-edge distance of a single bandpass filter, or a center-to-center distance of adjacent bandpass filters) to achieve the third filter alignment 30. As a result, the particular portion 104 of the scene 102 is filtered through the third frequency range (e.g., 610 THz-670 THz) such that, when the third image 154 is captured, a corresponding pixel (to the first detector 122 of the focal plane array 120) in the third image 154 includes data indicating an intensity of green light associated with the particular portion 104 and received at the first detector 122. The third image 154 depicts other portions of the scene 102 in colors corresponding to alignments with the other bandpass filters 110, 112, 116, 118.

Similar adjustment techniques can be performed to generate additional images that depict the particular portion 104 of the scene 102 in other colors. For example, the filter device 108A can be shifted downwards by a distance that matches the physical size of an individual bandpass filter 110-118 to achieve a fourth filter alignment (not shown) in which a fourth image has a pixel with data indicating an intensity of orange light detected at the first detector 122 and associated with the particular portion 104 of the scene 102. Additionally, the filter device 108A can be further shifted downwards by the physical size of an individual bandpass filter 110-118 to achieve a fifth filter alignment (not shown) in which a fifth image has a pixel with data indicating an intensity of yellow light detected at the first detector 122 and associated with the particular portion 104 of the scene 102. It should be understood that if the bandpass filters 110-118 are arranged in a different pattern, such as a square, the filter device 108A can be shifted in different directions to align each filter with the particular portion 104 of the scene 102.

Figure 2:
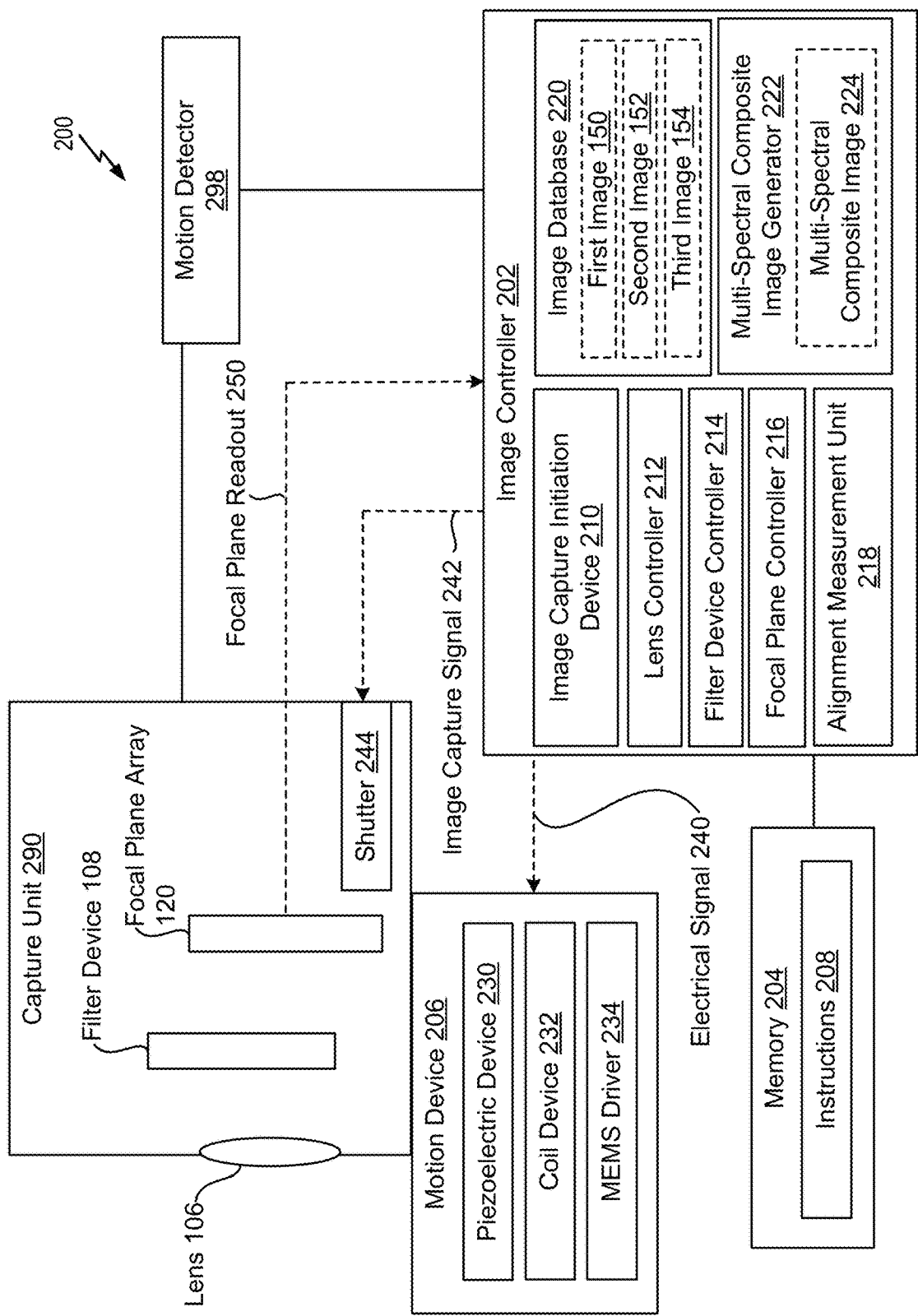
FIG. 2 is a diagram of an image capture device that is operable to control an alignment of a filter device to generate a multi-spectral composite image.

As described in greater detail with respect to FIG. 2, the images 150-154 are used to generate a multi-spectral composite image that has a relatively high spectral resolution for the particular portion 104 of the scene 102. Thus, the techniques described with respect to FIG. 1A enable improved spectral resolution of a composite image by capturing multiple images 150-154 with a substantially similar alignment between the particular portion 104 of the scene 102 and detectors of the focal plane array 120, and with different (shifted) configurations of the bandpass filters 110-118. As a non-limiting example, motion of the filter device 108A is controlled to capture different images 150-154 that have substantially similar alignments 130-134 to different bandpass filters 110-114, respectively. As a result, a relatively large number of images having similar alignments with respect to different bandpass filters can be captured and processed to increase a spectral resolution of the composite image.

Figure 1B:
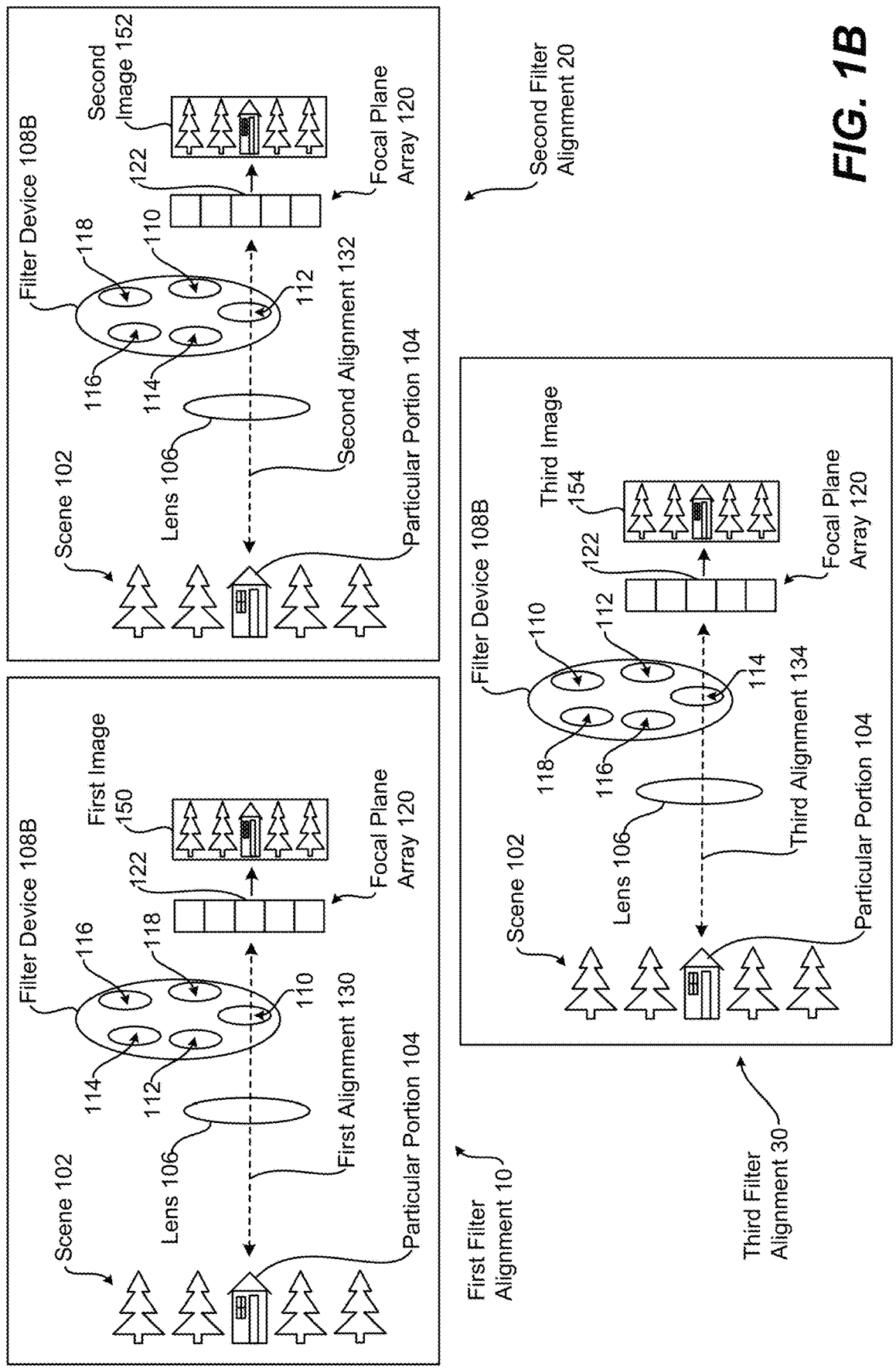
FIG. 1B is a diagram of another example of controlling an alignment of a filter device to generate multiple aligned images having different spectral qualities.

FIG. 1B is a diagram of another example of controlling alignment of a filter device to generate multiple aligned images having different spectral qualities. The techniques with respect to FIG. 1B are similar to the techniques described with respect to FIG. 1A; however, in FIG. 1B a different filter device 108B is illustrated. For example, the filter device 108B includes a filter wheel. Similar to the filter device 108A of FIG. 1A, the filter device 108B includes the first bandpass filter 110, the second bandpass filter 112, the third bandpass filter 114, the fourth bandpass filter 116, and the fifth bandpass filter 118.

In FIG. 1B, according to the illustration of the first filter alignment 10, the first bandpass filter 110 is aligned between the particular portion 104 of the scene 102 and the first detector 122 of the focal plane array 120. In contrast to FIG. 1A, a significant portion (or all) of the scene is filtered through a single filter at once (e.g., the entire scene is filtered through the first bandpass filter 110 for the first image 150, the entire scene is filtered through the second bandpass filter 112 for the second image 152, etc.), and a composite image can be formed via re-assembling the pixel positions of the focal plane array 120. As illustrated, the line indicative of the first alignment 130 intersects the particular portion 104 of the scene 102, the lens 106, the first bandpass filter 110, and the first detector 122 of the focal plane array 120. As a result, electromagnetic radiation received from the particular portion 104 of the scene 102 is filtered to pass electromagnetic radiation in the first frequency range (e.g., 430 THz-480 THz) such that, when the first image 150 is captured, a corresponding pixel (to the first detector 122 of the focal plane array 120) in the first image 150 has a pixel with data indicating an intensity of red light detected at the first detector 122 and associated with the particular portion 104 of the scene 102. In FIG. 1B, the first image 150 can include red pixel values of other portions of the scene 102 if each portion of the scene 102 is filtered through the first bandpass filter 110.

In FIG. 1B, according to the illustration of the second filter alignment 20, the second bandpass filter 112 is aligned between the particular portion 104 of the scene 102 and the first detector 122 of the focal plane array 120. For example, the line indicative of the second alignment 132 intersects the particular portion 104 of the scene 102, the lens 106, the second bandpass filter 112, and the first detector 122 of the focal plane array 120. Thus, the filter device 108B (e.g., the filter wheel) is rotated such that particular portion 104 of the scene 102 is aligned with the second bandpass filter 112 in substantially the same manner as the particular portion 104 of the scene 102 was aligned with the first bandpass filter 110 in the first filter alignment 10. As a result, electromagnetic radiation received from the particular portion 104 of the scene 102 is filtered to pass electromagnetic radiation in the second frequency range (e.g., 540 THz-580 THz) such that, when the second image 152 is captured, a corresponding pixel (to the first detector 122 of the focal plane array 120) in the second image 152 has a pixel with data indicating an intensity of green light detected at the first detector 122 and associated with the particular portion 104 of the scene 102. In FIG. 1B, the second image 152 can include green pixel values of other portions of the scene 102 if each portion of the scene 102 is filtered through the second bandpass filter 112.

In FIG. 1B, according to the illustration of the third filter alignment 30, the third bandpass filter 114 is aligned between the particular portion 104 of the scene 102 and the first detector 122 of the focal plane array 120. For example, the line indicative of the third alignment 134 intersects the particular portion 104 of the scene 102, the lens 106, the third bandpass filter 114, and the first detector 122 of the focal plane array 120. Thus, the filter device 108B (e.g., the filter wheel) is rotated such that particular portion 104 of the scene 102 is aligned with the third bandpass filter 114 in substantially the same manner as the particular portion 104 of the scene 102 was aligned with the second bandpass filter 112 in the second filter alignment 20. As a result, electromagnetic radiation received from the particular portion 104 of the scene 102 is filtered to pass electromagnetic radiation in the third frequency range (e.g., 610 THz-670 THz) such that, when the third image 154 is captured, a corresponding pixel (to the first detector 122 of the focal plane array 120) in the third image 154 has a pixel with data indicating an intensity of blue light detected at the first detector 122 and associated with the particular portion 104 of the scene 102. In FIG. 1B, the third image 154 can include blue pixel values of other portions of the scene 102 if each portion of the scene 102 is filtered through the third bandpass filter 114.

Similar adjustment techniques can be performed to generate additional images that include data of the particular portion 104 of the scene 102 for other colors. For example, the filter device 108B can be rotated to achieve a fourth filter alignment (not shown) in which a fourth image includes orange data of the particular portion 104 of the scene 102. Additionally, the filter device 108B can be rotated to achieve a fifth filter alignment (not shown) in which a fifth image includes yellow data of the particular portion 104 of the scene 102.

Although each of the filters 110-118 are each described as configured to pass electromagnetic radiation within a single frequency range, in other implementations one or more of the filters 110-118 includes multiple portions, and each of the multiple portions has a frequency range (e.g., a passband) that is distinct from the frequency range of another portion of that filter. As an illustrative, non-limiting example, the first filter 110 can be divided into four quadrants, and each quadrant can have a corresponding distinct passband (e.g., red, blue, green, and violet). The second filter 112 can also be divided into four quadrants with the same passbands, but having a different arrangement of the quadrant colors than the first filter 110 (e.g., blue, green, violet, red).

Figure 1C:
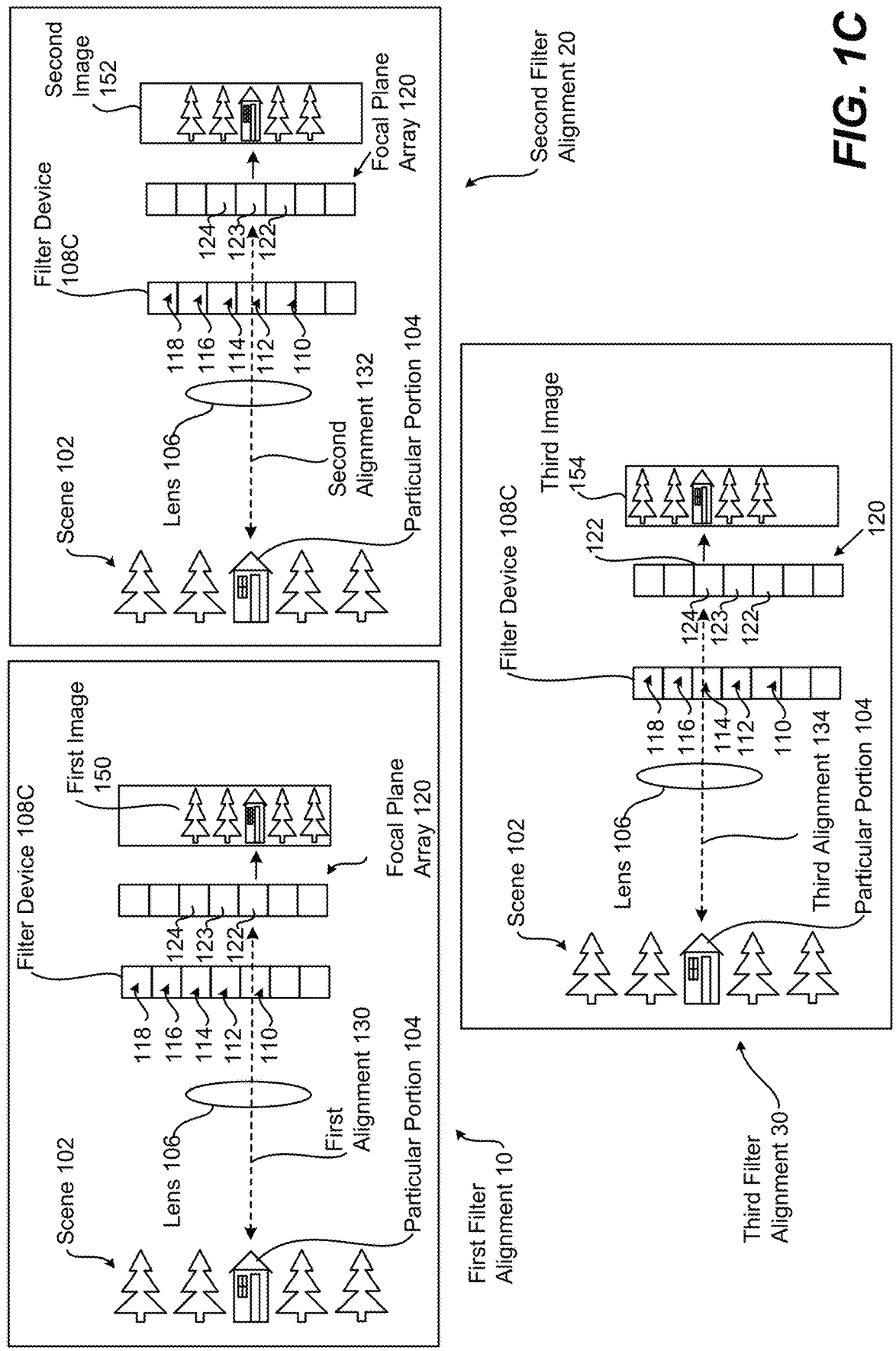
FIG. 1C is a diagram of an example of tracking a motion of a focal plane array relative to a scene to generate multiple aligned images having different spectral qualities.

FIG. 1C is a diagram of another example of controlling alignment of a filter device to generate multiple aligned images having different spectral qualities. The techniques with respect to FIG. 1C are similar to the techniques described with respect to FIGS. 1A and 1B; however, in FIG. 1C a position of an image capture device is adjusted to capture the images 150, 152, and 154. Adjusting the position of the image capture device, such as an image capture device 200 of FIG. 2, includes moving the components of the image capture device (e.g., the lens 106, the filter device 108C, and the focal plane array 120) based on a physical dimension or size (e.g., a "filter size") of an individual bandpass filter 110-118.

In FIG. 1C, according to the illustration of the first filter alignment 10, the first bandpass filter 110 is aligned between the particular portion 104 of the scene 102 and the first detector 122 of the focal plane array 120. For example, the line indicative of the first alignment 130 intersects the particular portion 104 of the scene 102, the lens 106, the first bandpass filter 110, and the first detector 122 of the focal plane array 120. As a result, electromagnetic radiation received from the particular portion 104 of the scene 102 is filtered to pass electromagnetic radiation in the first frequency range (e.g., 430 THz-480 THz) such that, when the first image 150 is captured, a corresponding pixel (to the first detector 122 of the focal plane array 120) in the first image 150 has a pixel with data indicating an intensity of red light detected at the first detector 122 and associated with the particular portion 104 of the scene 102.

In FIG. 1C, according to the illustration of the second filter alignment 20, the position of the image capture device is adjusted (or moves) relative to the scene 102 by an amount that matches the filter size of an individual bandpass filter 110-118 such that the second bandpass filter 112 is aligned between the particular portion 104 of the scene 102 and the second detector 123 of the focal plane array 120. For example, the line indicative of the second alignment 132 intersects the particular portion 104 of the scene 102, the lens 106, the second bandpass filter 112, and the second detector 123 of the focal plane array 120. As a result, electromagnetic radiation received from the particular portion 104 of the scene 102 is filtered to pass electromagnetic radiation in the second frequency range (e.g., 540 THz-580 THz) such that, when the second image 152 is captured, a corresponding pixel (to the second detector 123 of the focal plane array 120) in the second image 152 has a pixel with data indicating an intensity of green light detected at the second detector 123 and associated with the particular portion 104 of the scene 102.

In FIG. 1C, according to the illustration of the third filter alignment 30, the position of the image capture device is again adjusted (or moves) relative to the scene 102 by an amount that matches the filter size of an individual bandpass filter 110-118 such that the third bandpass filter 114 is aligned between the particular portion 104 of the scene 102 and the third detector 124 of the focal plane array 120. For example, the line indicative of the third alignment 134 intersects the particular portion 104 of the scene 102, the lens 106, the third bandpass filter 114, and the third detector 124 of the focal plane array 120. As a result, electromagnetic radiation received from the particular portion 104 of the scene 102 is filtered to pass electromagnetic radiation in the third frequency range (e.g., 610 THz-670 THz) such that, when the third image 154 is captured, a corresponding pixel (to the third detector 124 of the focal plane array 120) in the third image 154 has a pixel with data indicating an intensity of blue light detected at the third detector 124 and associated with the particular portion 104 of the scene 102.

Similar adjustment techniques can be performed to generate additional images that include data of the particular portion 104 of the scene 102 for other colors. For example, the position of the image capture device can drift relative to the scene 102 to achieve a fourth filter alignment (not shown) in which a fourth image includes orange data of the particular portion 104 of the scene 102.

As described in greater detail with respect to FIG. 2, the images 150-154 are used to generate a multi-spectral composite image that has a relatively high spectral resolution for the particular portion 104 of the scene 102. Thus, the techniques described with respect to FIG. 1C enable improved spectral resolution of a composite image by capturing multiple images 150-154 with a substantially similar alignment between the particular portion 104 of the scene 102 and the focal plane array 120, with different configurations (e.g., selections of) of the bandpass filters 110-118. As a result, a relatively large number of images having similar alignments and taken with different bandpass filters can be captured and processed to increase a spectral resolution of the composite image.

Although the filters 110-118 are described as physical filters interposed between the scene 102 and the focal plane array 120, in other implementations the filters 110-118 are implemented via other mechanisms, such as by chemically tuning the response of different groups of detectors to be responsive to different frequencies. As a particular example, a detector that is engineered to only receive red light can be equivalent to a broadband detector with a red filter maintaining position over the broadband detector.

FIG. 2 is a diagram of an image capture device 200 that is operable to control an alignment of a filter device to generate a multi-spectral composite image. The image capture device 200 can include one of a video camera, a picture camera, a thermal imaging camera, a microwave imager, or a radiation detector.

The image capture device 200 includes an image controller 202, a memory 204 coupled to the image controller 202, a motion device 206 coupled to the image controller 202, a motion detector 298 coupled to the image controller 202, and a capture unit 290 coupled to the image controller 202. The capture unit 290 includes the lens 106, a filter device 108, the focal plane array 120, and a shutter 244. The filter device 108 can correspond to the filter device 108A of FIG. 1A, the filter device 108B of FIG. 1B, the filter device 108C of FIG. 1C, or another filter device. The memory 204 is a computer-readable storage device that stores instructions 208 that, when executed by the image controller 202, cause the image controller 202 to perform operations described herein.

The image controller 202 includes an image capture initiation device 210, lens controller 212, a filter device controller 214, a focal plane controller 216, an alignment measurement unit 218, an image database 220, and a multi-spectral composite image generator 222. The image capture initiation device 210 is configured to initiate capture of the first image 150 of the scene 102 while the particular portion 104 of the scene 102 has a first alignment (e.g., the first alignment 130) with a first detector (e.g., the first detector 122) of the focal plane array 120 and a first bandpass filter (e.g., the first bandpass filter 110) is between the particular portion 104 of the scene 102 and the first detector. For example, the image capture initiation device 210 can generate an image capture signal 242 that is provided to the shutter 244. In response to receiving the image capture signal 242, the shutter 244 is activated to capture the first image 150 as a focal plane readout 250. The first image 150 is stored in the image database 220 for additional processing, as described below.

The image controller 202 is also configured to determine (e.g., detect or measure) when the particular portion 104 of the scene 102 has a second alignment (e.g., the second alignment 132) with a second detector of the focal plane array, the second alignment substantially matching the first alignment. In response to determining that the particular portion 104 of the scene 102 has the second alignment and that a second bandpass filter is between the particular portion of the scene and the second detector, the image controller 202 is configured to initiate storage of a second image (e.g., the second image 152) of the scene 102. The second image is captured while the particular portion 104 of the scene 102 has the second alignment with the second detector. In some implementations, such as described in FIG. 1C, the second detector is different from the first detector (e.g., the focal plane array 120 has moved, relative to the scene 102, by at least a detector width between capture of the first image and capture of the second image). In other implementations, such as described in FIGS. 1A and 1B, the first detector and the second detector are the same detector (e.g., the focal plane array 120 has not substantially moved relative to the scene 102 between capture of the first image and capture of the second image).

For example, in some implementations, the image controller 202 is configured to cause a position of one or more component of the image capture device 200 to be adjusted to generate the second alignment 132 of the particular portion 104 of the scene 102 with the second detector, as depicted in FIG. 1A. The one or more component can include the filter device 108, the focal plane array 120, or the lens 106. To adjust the position of the lens 106, the lens controller 212 generates an electrical signal 240 that causes the motion device 206 to move or refocus the lens 106. The motion device 206 can include a piezoelectric device 230, a coil device 232, or a microelectromechanical system (MEMS) driver 234. To adjust the position of the focal plane array 120, the focal plane controller 216 generates the electrical signal 240 that cause the motion device 206 to move (e.g., shift, slant, or tilt) the focal plane array 120 such that the second filter alignment 20 is achieved.

To adjust the position of the filter device 108, the filter device controller 214 generates the electrical signal 240 that causes the motion device 206 to move the filter device 108. As a non-limiting example, the electrical signal 240 can cause the MEMS driver 234 to shift the filter device 108A downwards by the physical size of an individual bandpass filter 110-118 to achieve the second filter alignment 20, as described in FIG. 1A. As another non-limiting example, the electrical signal 240 can cause the coil device 232 to rotate the filter device 108B to achieve the second filter alignment 20, as described in FIG. 1B.

The alignment measurement unit 218 is configured to determine whether the first alignment 130 between the particular portion 104 of the scene 102, the first bandpass filter 110, and the first detector 122 of the focal plane array 120 in the first filter alignment 10 substantially matches (e.g., within a threshold) of the second alignment 132 between the particular portion 104 of the scene 102 and the first detector 122 of the focal plane array 120 in the second filter alignment 20. In response to determining that the first alignment 130 substantially matches the second alignment 132, the image capture initiation device 210 is configured to initiate capture of the second image 152 of the scene 102 using the filter device 108 while the filter device 108 has the second filter alignment 20 with respect to the scene 102 and the focal plane array 120. For example, the image capture initiation device 210 can generate the image capture signal 242 that is provided to the shutter 244. In response to receiving the image capture signal 242, the shutter 244 is activated to capture the second image 152 as the focal plane readout 250. The second image 152 is stored in the image database 220 for additional processing, as described below.

In response to capturing the second image 152, the image controller 202 is configured to adjust the position of the one or more component of the image capture device 200 such that the filter device 108 has the third filter alignment 30 with respect to the scene 102 and the focal plane array 120. To adjust the position of the filter device 108 such that the filter device 108 has the third filter alignment 30, the filter device controller 214 generates the electrical signal 240 that causes the motion device 206 to move the filter device 108. As a non-limiting example, the electrical signal 240 can cause the MEMS driver 234 to shift the filter device 108A downwards by the physical size of an individual bandpass filter 110-118 to achieve the third filter alignment 30, as described in FIG. 1A. As another non-limiting example, the electrical signal 240 can cause the coil device 232 to rotate the filter device 108B to achieve the third filter alignment 30, as described in FIG. 1B.

The alignment measurement unit 218 is configured to determine whether the second alignment 132 between the particular portion 104 of the scene 102, the second bandpass filter 112, and the first detector 122 of the focal plane array 120 in the second filter alignment 20 substantially matches (e.g., within a threshold) of the third alignment 136 between the particular portion 104 of the scene 102 and the first detector 122 of the focal plane array 120 in the third filter alignment 30. In response to determining that the second alignment 132 substantially matches the third alignment 134, the image capture initiation device 210 is configured to initiate capture of the third image 154 of the scene 102 using the filter device 108 while the filter device 108 has the third filter alignment 30 with respect to the scene 102 and the focal plane array 120. For example, the image capture initiation device 210 can generate the image capture signal 242 that is provided to the shutter 244. In response to receiving the image capture signal 242, the shutter 244 is activated to capture the third image 154 as the focal plane readout 250. The third image 154 is stored in the image database 220 for additional processing, as described below.

In some implementations, the motion detector 298 includes one or more sensors, such as one or more gyroscopes, accelerometers, gravity detectors, etc., and is configured to detect motion (e.g., linear or rotational translation, linear or rotational acceleration, or any combination thereof) of the image capture device 200, or the capture unit 290, of one or more components of the capture unit 290 (e.g., the filter device 108), or a combination thereof. In a particular example, the motion detector 298 is included within an inertial management unit. The motion detector 298 sends motion data to the image controller 202.

The image controller 202 is responsive to motion data from the motion detector 298 and is configured to track a motion of the focal plane array 120 relative to the particular portion 104 of the scene 102. For example, in some implementations the image controller 202 is configured to initiate capture of the second image in response to determining, based on the motion, that the particular portion 104 of the scene 102 has the second alignment with the second detector. For example, the image controller 202 may initiate image capture via the image capture initiation device 210 in response to the motion data indicating that the particular portion 104 of the scene 102 has the second alignment 132 with the second detector 123 as illustrated in FIG. 1C. In other implementations, the image capture initiation device 210 may operate in an "auto-capture" mode that captures images at a determined image capture rate and independently of any particular alignment of the focal plane array 120 with the scene 102. In such implementations, the image controller 202 is configured to discard one or more additional images of the scene that are captured between capture of the first image and capture of the second image and in which the particular portion of the scene is determined, based on the motion of the focal plane array, to not have the second alignment with the second detector. As an example, auto-generated images that are determined to have one of the alignments 130, 132, and 134 of FIG. 1C are stored in the image database 220 and auto-generated images that are not determined to have any of the alignments 130, 132, and 134 of FIG. 1C are discarded (e.g., deleted, overwritten, or designated as invalid data).

The multi-spectral composite image generator 222 is configured to generate a multi-spectral composite image 224 based on the first image 150, the second image 152, and the third image 154. The multi-spectral composite image 224 may have a relatively high spectral resolution for the particular portion 104 of the scene 102. For example, the spectral resolution for the particular portion 104 of the scene 102 in the multi-spectral composite image 224 is higher than the spectral resolution of the particular portion 104 of the scene in the individual images 150-154.

Thus, the image capture device 200 of FIG. 2 enables improved spectral resolution of a composite image (e.g., the multi-spectral composite image 224) by capturing multiple images 150-154 with a substantially similar alignment between the particular portion 104 of the scene 102, the focal plane array 120, and using different configurations of the bandpass filters 110-118. As a non-limiting example, motion and positioning of components of the image capture device 200 are controlled to capture different images 150-154 that have substantially similar alignments 130-134 using different bandpass filters 110-114, respectively. As a result, a relatively large number of images having similar alignments with respect to different bandpass filters can be captured and processed to increase a spectral resolution of the multi-spectral composite image 224.

Figure 3:
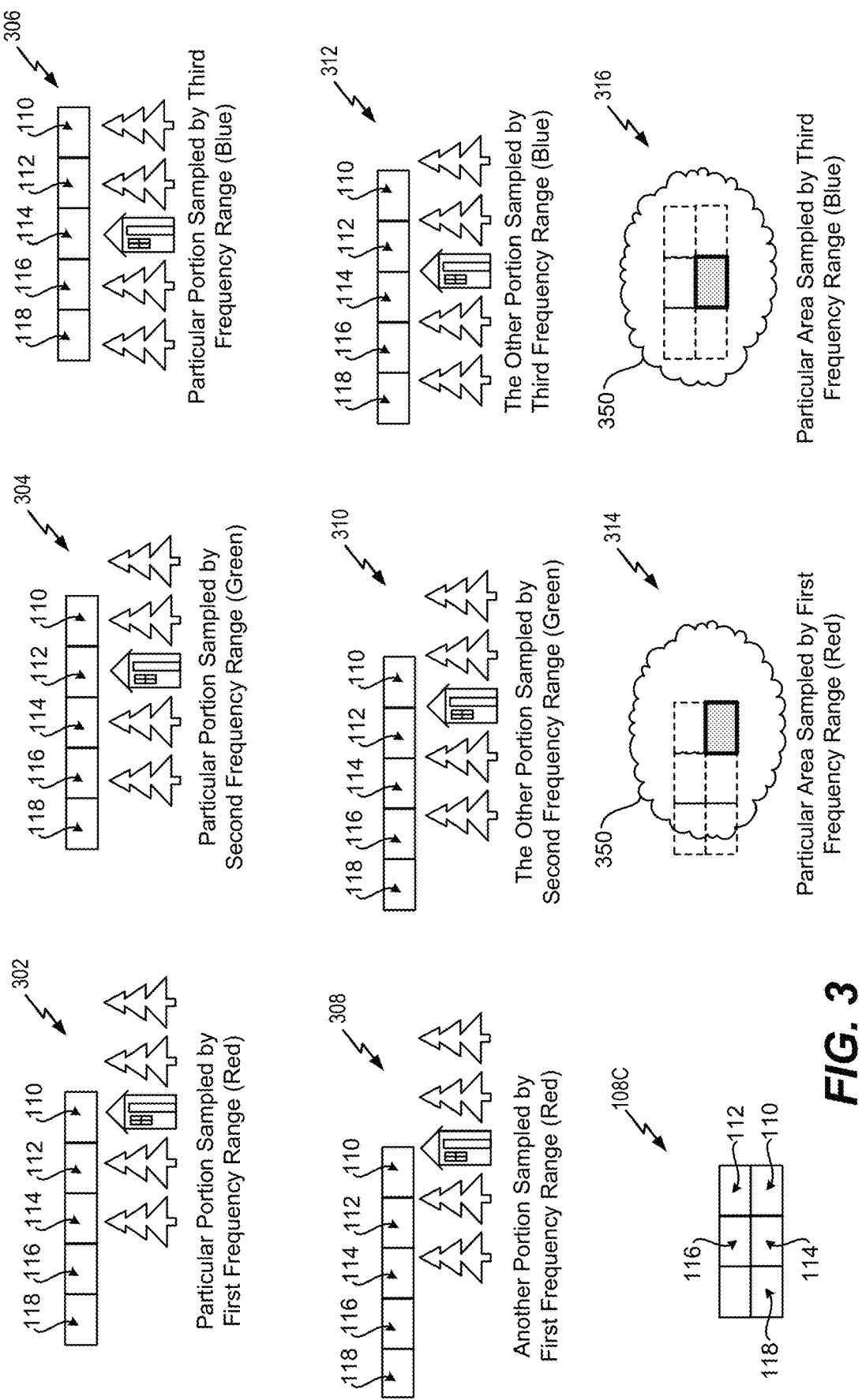
FIG. 3 depicts examples of sampling different portions of an image using different bandpass filters to generate multiple aligned images having different spectral qualities.

FIG. 3 depicts examples of sampling different portions of an image using different bandpass filters to generate multiple aligned images having different spectral qualities.

According to a first example 302, the first bandpass filter 110 (having the first frequency range) is used to sample the particular portion 104 of the scene 102. For example, the first bandpass filter 110 is used to sample the house to generate the first image 150, as described with respect to the first filter alignment 10 in FIG. 1A. As a result, the first image 150 records a red component of the particular portion 104 of the scene 102. According to a second example 304, the second bandpass filter 112 (having the second frequency range) is used to sample the particular portion 104 of the scene 102. For example, the second bandpass filter 112 is used to sample the house to generate the second image 152, as described with respect to the second filter alignment 20 in FIG. 1A. As a result, the second image 152 records a green component of the particular portion 104 of the scene 102. According to a third example 306, the third bandpass filter 114 (having the third frequency range) is used to sample the particular portion 104 of the scene 102. For example, the third bandpass filter 114 is used to sample the house to generate the third image 154, as described with respect to the third filter alignment 30 in FIG. 1A. As a result, the third image 154 records a blue component of the particular portion 104 of the scene 102. The data collected in each pixel in the examples 302, 304, and 306 provides a spectrum (e.g., relationship of signal power to frequency) of the portion of the scene viewed by each pixel. As described with respect to FIG. 2, the multi-spectral composite image generator 222 generates the multi-spectral composite image 224 based, at least in part, on the images 150-154.

As shown in examples 302-306, the particular portion 104 of the scene 102 is depicted as a house for purpose of illustration, it should be understood that the image capture device does not need to align a pixel on a specific target. The alignment can be anywhere in the scene, with the alignment of subsequent images being controlled. An illustration of such operation is depicted in the following examples 308-312.

According to a fourth example 308, the first bandpass filter 110 (having the first frequency range) is used to sample another portion of the scene 102. For example, the first bandpass filter 110 is used to sample a portion of the house and a portion of a tree to generate a fourth image. As a result, the fourth image records a red component of the portion of the house and the portion of the tree. According to a fifth example 310, the second bandpass filter 112 (having the second frequency range) is used to sample the other portion of the scene 102. For example, the second bandpass filter 112 is used to sample the portion of the house and the portion of a tree to generate a fifth image. As a result, the fifth image records a green component of the portion of the house and the portion of the tree. According to a sixth example 312, the third bandpass filter 114 (having the third frequency range) is used to sample the other portion of the scene 102. For example, the third bandpass filter 114 is used to sample the portion of the house and the portion of a tree to generate a sixth image. As a result, the sixth image records a blue component of the portion of the house and the portion of the tree. The data collected in each pixel in the examples 308, 310, and 312 provides a spectrum (e.g., relationship of signal power to frequency) of the portion of the scene viewed by each pixel. The multi-spectral composite image generator 222 is configured to generate a multi-spectral composite image based, at least in part, on the fourth image, the fifth image, and the sixth image.

FIG. 3 also illustrates another example of a filter device 108C. The filter device 108C can correspond to the filter device 108 of FIG. 2. The filter device 108C includes the bandpass filters 110-118 arranged in a different pattern as compared to the arrangement of the bandpass filters 110-118 in the other filter devices 108A, 108B. According to a seventh example 314, the first bandpass filter 110 of the filter device 108C is used to sample a particular area of a scene 350 to generate a seventh image. As a result, the seventh image records a red component of the particular area. According to an eighth example 316, the second bandpass filter 112 of the filter device 108C is used to sample the particular area of the scene 350 to generate an eighth image. As a result, the eighth image records a blue component of the particular area. The multi-spectral composite image generator 222 is configured to generate a multi-spectral composite image based, at least in part, on the seventh image and the eighth image.

The techniques described with respect to FIG. 3 enable improved spectral resolution of a composite image by capturing multiple images with a substantially similar alignment and using different configurations of the bandpass filters 110-118 of the filter device 108. For example, boundaries (or a center or other reference point) of the first bandpass filter 110 in the first example 302 are aligned with boundaries (or the center or other reference point) of the second bandpass filter 112 in the second example 304. As a result, multiple aligned images having different color samples can be generated for use by the multi-spectral composite image generator 222 to generate the multi-spectral composite image having improved spectral resolution.

FIG. 4 is a flowchart of a method 400 for controlling an alignment of a filter device to generate a multi-spectral composite image. The method 400 can be performed by the image capture device 200 of FIG. 2.

FIG. 4 is a flowchart of a method 400 of capturing image data. The method 400 can be performed by the image capture device 200 of FIG. 2.

The method 400 includes capturing, with an image device, a first image of a scene while a particular portion of the scene has a first alignment with a first detector of a focal plane array and a first bandpass filter is between the particular portion of the scene and the first detector, at 402. For example, as described with respect to FIGS. 1A-2, the capture unit 290 captures the first image 150 of the scene while the particular portion 104 of the scene 102 has the first alignment with the first detector 122 of the focal plane array 120 and the first bandpass filter 110 is between the particular portion 104 of the scene 102 and the first detector 122.

The method 400 also includes in response to determining that the particular portion of the scene has a second alignment with a second detector of the focal plane array, the second alignment substantially matching the first alignment, and that a second bandpass filter having a second frequency range that is distinct from a first frequency range of the first bandpass filter is between the particular portion of the scene and the second detector, initiating storage of a second image of the scene, at 404. The second image is captured while the particular portion of the scene has the second alignment. For example, as described with respect to FIGS. 1A-2, the image controller 202 can determine that the particular portion 104 of the scene has the second alignment 132 with the second detector 123 of the focal plane array 120. The image controller 202 can also determine that the second alignment 132 substantially matches the first alignment 130 and that the second bandpass filter 112 is between the particular portion 104 of the scene 102 and the second detector 123. In response to the determinations, the image controller 202 initiates storage of the second image 152 of the scene 102. The second image 152 is captured while the particular portion 104 of the scene 102 has the second alignment 132 with the second detector 123.

The method 400 also includes generating a multi-spectral composite image using at least the first image and the second image, at 406. For example, in FIG. 2, the multi-spectral composite image generator 22 generates the multi-spectral image 224 using at least the first image 150 and the second image 152.

According to one implementation, the method 400 includes causing a position of one or more components of the image capture device to be adjusted to generate the second alignment of the particular portion of the scene with the second detector. The one or more components of the image capture device include the filter device, the focal plane array, or a lens. The position of the one or more components of the image capture device is adjusted using a piezoelectric device, a coil device, or a microelectromechanical system driver. According to one implementation, adjusting the position of the one or more components of the image capture device includes shifting a position of a filter array based on a physical dimension of the first bandpass filter or rotating a filter wheel.

According to one implementation, the method 400 includes tracking a motion of the focal plane array relative to the particular portion of the scene. The method 400 can also include initiating capture of the second image in response to determining, based on the motion, that the particular portion of the scene has the second alignment with the second detector.

According to one implementation, the method 400 includes tracking a motion of the focal plane array relative to the particular portion of the scene. The method 400 can also include discarding one or more additional images of the scene, that are captured between capture of the first image and capture of the second image, in which the particular portion of the scene is determined, based on the motion of the focal plane array, to not have the second alignment with the second detector.

Thus, the method 400 of FIG. 4 enables improved spectral resolution of a composite image (e.g., the multi-spectral composite image 224) by capturing multiple images 150-154 with a substantially similar alignment between the particular portion 104 of the scene 102 and the focal plane array 120, using bandpass filters 110-118. As a non-limiting example, motion and positioning of components of the image capture device 200 are controlled to capture different images 150-154 that have substantially similar alignments 130-134 (of the scene 102 to the focal plane array 120). As a result, a relatively large number of images having similar alignments using to different bandpass filter configurations can be captured and processed to increase a spectral resolution of the multi-spectral composite image 224.

Figure 5:
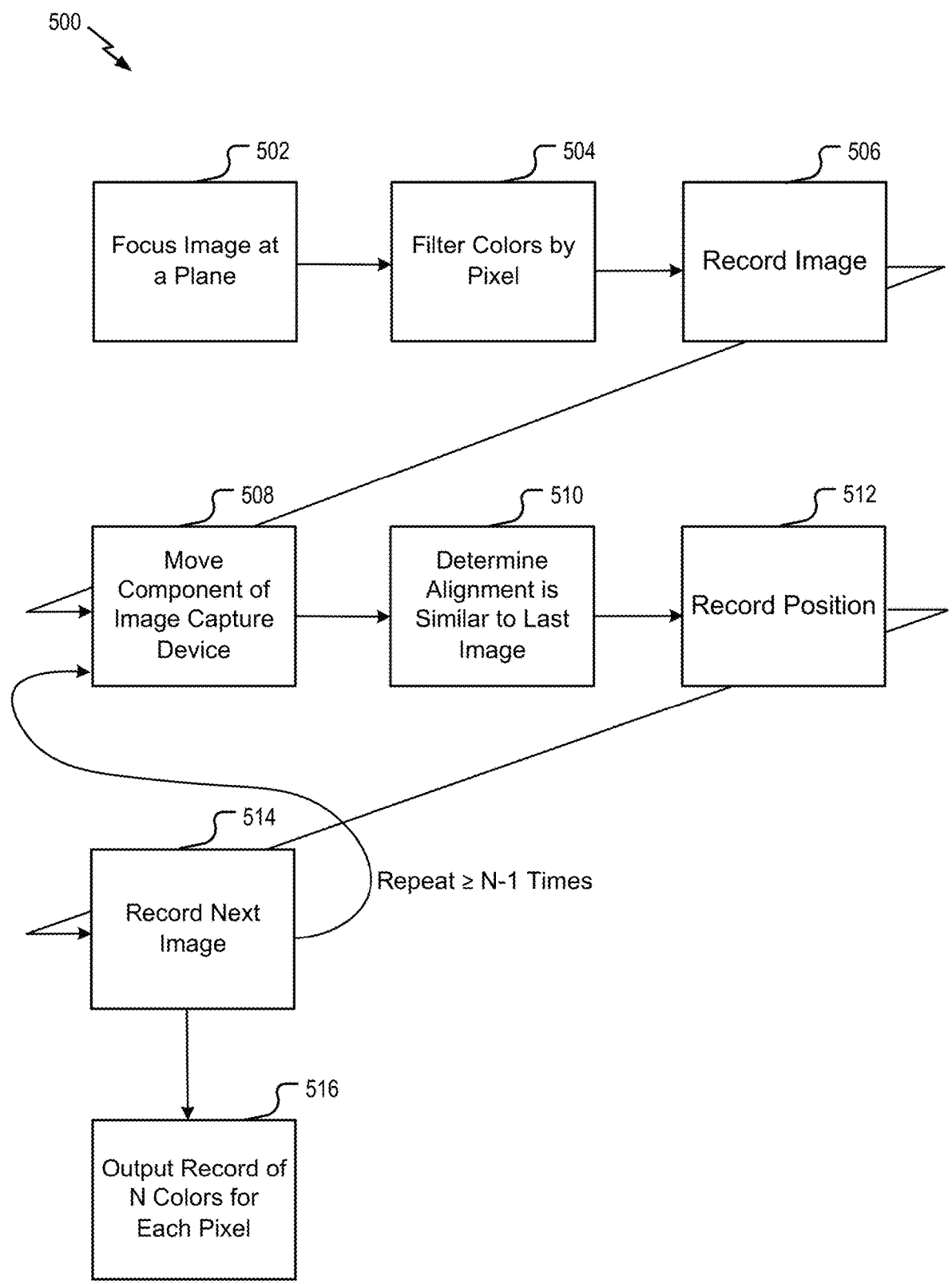
FIG. 5 is another flowchart of a method for controlling an alignment of a filter device to generate a multi-spectral composite image.

FIG. 5 is another flowchart of a method 500 for controlling an alignment of a filter device to generate a multi-spectral composite image. The method 500 can be performed by the image capture device 200 of FIG. 2.

The method 500 includes focusing an image at a plane, at 502. For example, the image controller 202 can control operation of the capture unit 290 such that the lens 106 focuses the scene on the focal plane array 120. The method 500 also includes filtering colors by pixel. For example, the filter device 108 can filter colors of the scene using the bandpass filters 110-118. To illustrate, according to the first example 302 in FIG. 3, the filter device 108 can filter the house using the first bandpass filter 110 such that the associated pixel in the first image 150 has a red pixel value, the filter device 108 can filter the tree to the left of the house using the second bandpass filter 112 such that the associated pixel in the first image 150 has a green pixel value, and the filter device 108 can filter the tree to the left of the tree to the left of the house using the third bandpass filter 114 such that the associated pixel in the first image has a blue pixel value.

The method 500 also includes recording the image, at 506. For example, the image capture initiation device 210 initiates capture of the first image 150 of the scene 102, filtered using the filter device 108, while the filter device 108 is aligned according to the first example 302. The image capture initiation device 210 generates the image capture signal 242 that is provided to the shutter 244. In response to receiving the image capture signal 242, the shutter 244 is activated to capture the first image 150 as the focal plane readout 250. The first image 150 is stored (e.g., recorded) in the image database 220 (e.g., in the memory 204).

The method 500 also includes moving a component of the image capture device, at 508. For example, the image controller 202 adjusts the position of one or more component of the image capture device 200. The one or more component can include the filter device 108, the focal plane array 120, or the lens 106. For ease of explanation with respect to FIG. 5, unless otherwise noted, the one or more component includes the filter device 108. Thus, the filter device controller 214 can shift the filter device 108 by a filter size (e.g., physical dimension) of a bandpass filter 110-118 to achieve the alignment illustrated in the second example 304. In other implementations, the entire image capture device can undergo motion relative to the scene, and such motion can be detected by the motion detector 298 and tracked by the image controller 202. The method 500 also includes determining that the alignment with respect to the filter device is similar to the alignment in the last image that was captured, at 510. For example, the alignment measurement unit 218 can determine that the bandpass filter alignment in the first example 302 is similar to the bandpass filter alignment in the second example 304.

The method 500 also includes recording the position of one or more component, at 512. For example, image controller 202 can record the position of the filter device 108 in the second example 304. The method 500 further includes recording a next image, at 514. For example, the image capture initiation device 210 initiates capture of the second image 152 of the scene 102 while the filter device 108 is aligned according to the second example 304. Alternatively, image capture can proceed automatically, and the image corresponding to the recorded position is recorded, while other, misaligned images are discarded. Process steps 508-514 can be repeated at least N−1 times, where N is an integer greater than two (2). Then, the method 500 includes outputting a record of N colors for each pixel, at 516. For example, each recorded color for each pixel during the method can be output to the multi-spectral composite image generator 222 to generate a multi-spectral composite image.

Figure 6:
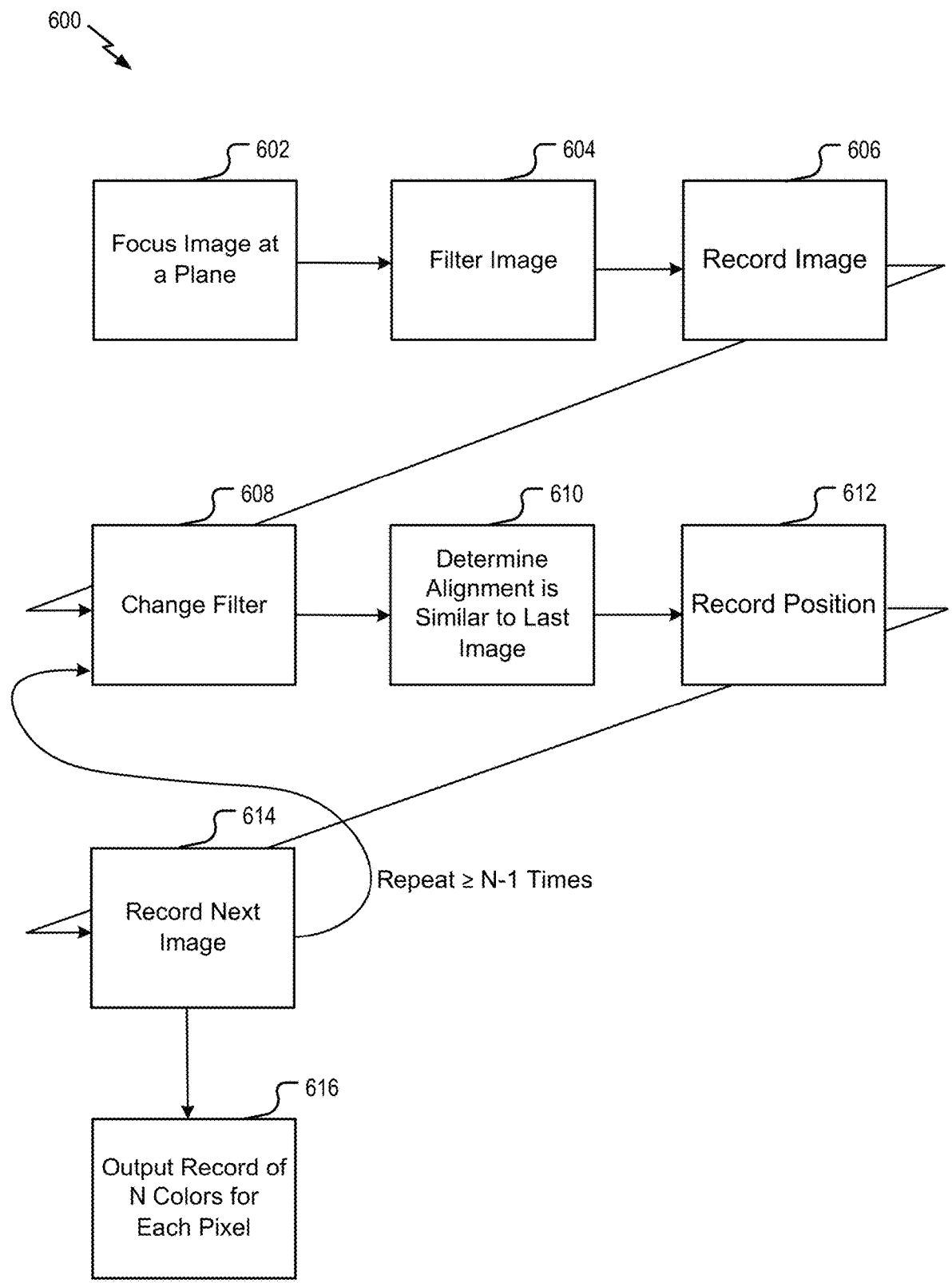
FIG. 6 is another flowchart of a method for controlling an alignment of a filter device to generate a multi-spectral composite image.

FIG. 6 is another flowchart of a method 600 for controlling an alignment of a filter device to generate a multi-spectral composite image. The method 600 can be performed by the image capture device 200 of FIG. 2.

The method 600 includes focusing an image at a plane, at 602. For example, the image controller 202 can control operation of the capture unit 290 such that the lens 106 focuses the scene on the focal plane array 120. The method 600 also includes filtering the focused image. For example, the filter device 108B can filter colors of the scene using the bandpass filters 110-118. To illustrate, according to the first filter alignment 10 in FIG. 1B, the filter device 108 can filter electromagnetic radiation received from the scene 102 using the first bandpass filter 110 such that the associated pixels in the first image 150 have red pixel values.

The method 600 also includes recording the image, at 606. For example, the image capture initiation device 210 initiates capture of the first image 150 of the scene 102 using the filter device 108B while the filter device 108B is aligned according to the first filter alignment 10 in FIG. 1B. The image capture initiation device 210 generates the image capture signal 242 that is provided to the shutter 244. In response to receiving the image capture signal 242, the shutter 244 is activated to capture the first image 150 as the focal plane readout 250. The first image 150 is stored (e.g., recorded) in the image database 220.

The method 600 also includes changing a filter, at 608. For example, the filter device controller 214 can generate the electrical signal 240 to cause the motion device 206 to rotate the filter device 108B according to the second filter alignment 20 in FIG. 1B. The method 600 also includes determining that the alignment with respect to the filter device is similar to the alignment in the last image that was recorded, at 610. For example, the alignment measurement unit 218 can determine that the first filter alignment 10 in FIG. 1B is similar to the second filter alignment 20 in FIG. 1B.

The method 600 also includes recording the position of the filter device or of one or more component of the image capture device, at 612. For example, image controller 202 can record the position of the filter device 108B in the second filter alignment 20 in FIG. 1B. The method 600 further includes recording a next image, at 614. For example, the image capture initiation device 210 initiates capture of the second image 152 of the scene 102 using the filter device 108B while the filter device 108B is aligned according to the second filter alignment 20. Process steps 608-614 can be repeated at least N-1 times, where N is an integer greater than two (2). Then, the method 600 includes outputting a record of N colors for each pixel, at 616. For example, each recorded color for each pixel during the method can be output to the multi-spectral composite image generator 222 to generate a multi-spectral composite image.

Figure 7:
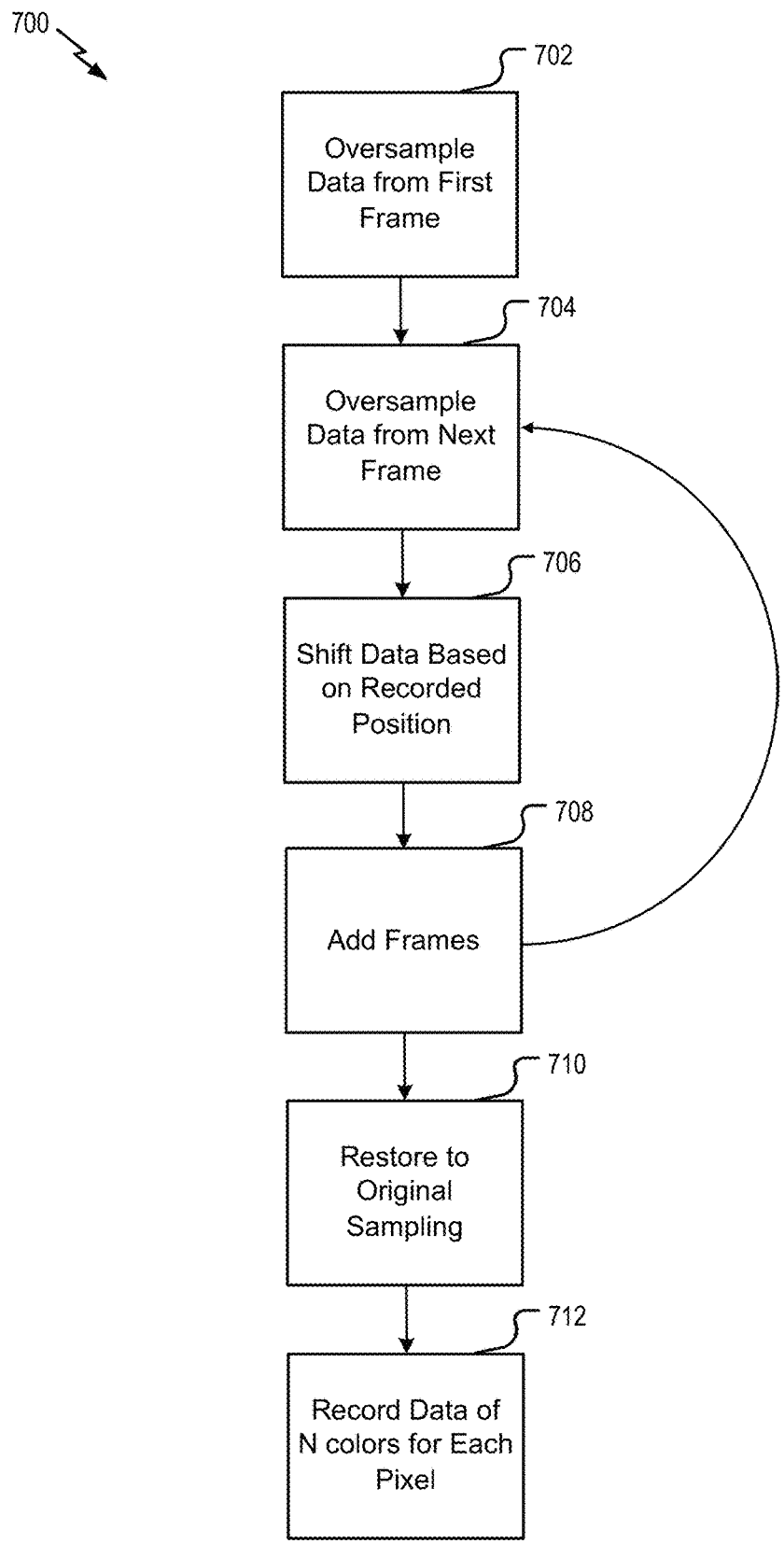
FIG. 7 is a method for outputting multiple colors for pixels in a scene.

FIG. 7 is a method 700 for outputting multiple colors for pixels in a scene. The method 700 can be performed by the image capture device 200 of FIG. 2.

The method 700 includes oversampling data from a first frame, at 702. For example, the image capture device 200 can oversample data from a first frame of a scene. The method 700 also includes oversampling data from a next frame, at 704. For example, the image capture device 200 can oversample data from a second frame of a scene. The method 700 also includes shifting data based on a recorded position, at 706. For example, the image capture device 200 can shift data in the second frame based on an offset (e.g., a difference in alignment of the scene 102 with respect to the focal plane array 120) between the first frame and the second frame. At 708, the method 700 can include repeating process steps 704-706 for additional frames. At 710, the method 700 includes restoring to the original sampling. At 712, the method 700 includes recording data of the colors for each pixel based on the oversampling. After recording the data, which can include discarding or ignoring data when pixels are not well-aligned, the instances (e.g., frames) are processed to create M images for M color (or frequency) bands, where M is an integer greater than two (2).

Figure 8:
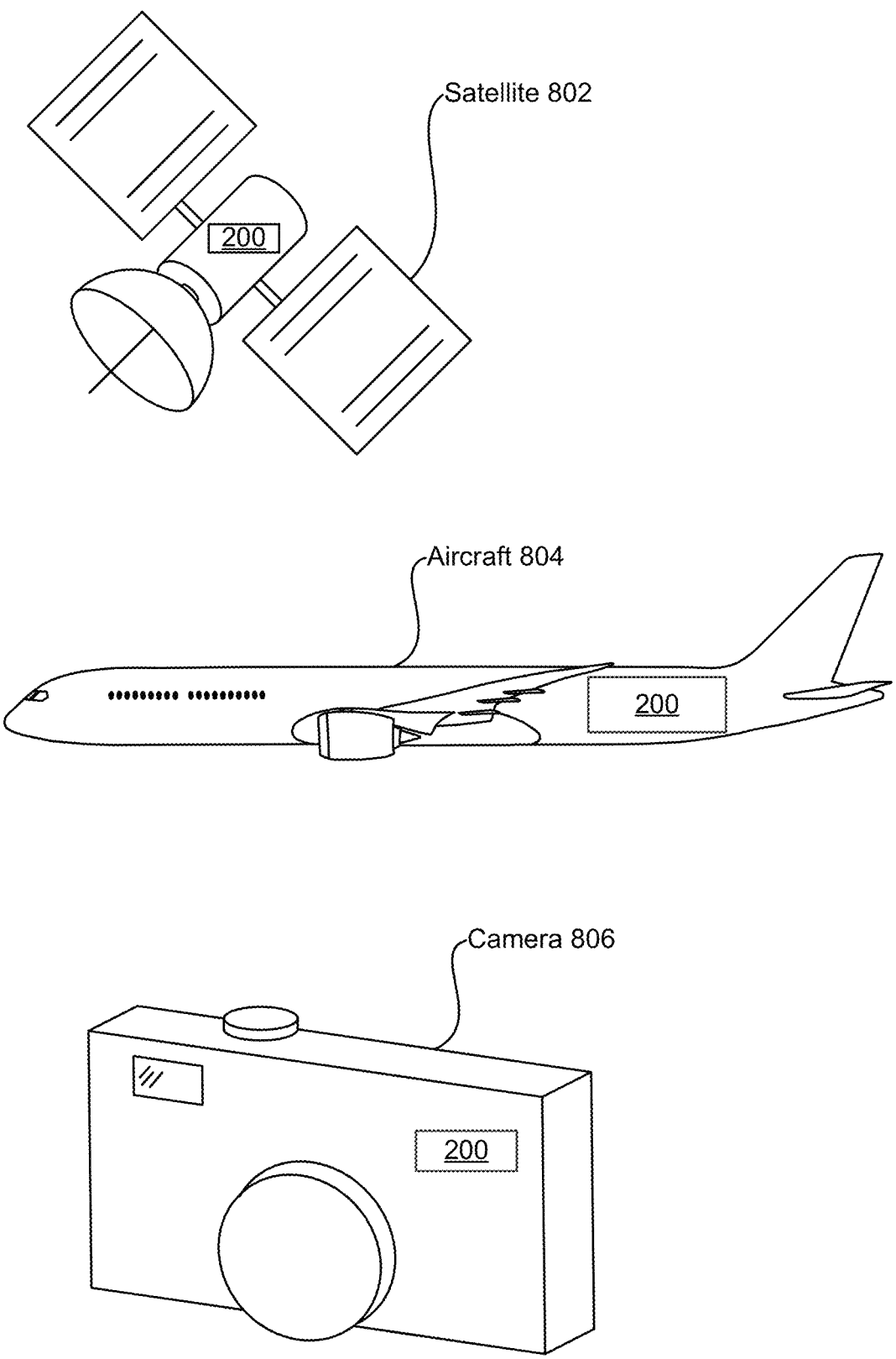
FIG. 8 depicts examples of implementations that include the image capture device of FIG. 2.

FIG. 8 illustrates examples of the image capture device integrated into different devices. In a first implementation, the image capture device 200 is integrated into a satellite 802. The satellite 802 is configured to use the image capture device 200 to generate a multi-spectral composite image, such as the multi-spectral composite image 224, according to techniques described above. In a second implementation, the image capture device 200 is integrated into a vehicle. For example, as illustrated in FIG. 8, the image capture device 200 can be integrated into an aircraft 804. Although depicted in the aircraft 804, it should be understood that the image capture device 200 can be integrated into other vehicles, such as a helicopter, a submarine, a car, etc. In a third implementation, the image capture device 200 is integrated into a camera 806, such as a hand-held camera. The camera 806 can include a video camera, a picture camera, a thermal imaging camera, a microwave imager, a radiation detector, etc. Although three examples are depicted in FIG. 8, the image capture device 200 is not limited to the three depicted examples and can instead be implemented in any other device (e.g., mounted to a building or other structure, such as in a security camera device, or included in a mobile or wearable electronic device, as additional, non-limiting examples).

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. An image capture device comprising:
   a filter device comprising at least a first bandpass filter having a first frequency range and a second bandpass filter having a second frequency range that is distinct from the first frequency range;
   a focal plane array comprising a plurality of detectors; and
   an image controller coupled to the filter device and the focal plane array, the image controller configured to:
      initiate capture of a first image of a scene while a particular portion of the scene has a first alignment with a first detector of the focal plane array and the first bandpass filter is between the particular portion of the scene and the first detector;
      determine that the particular portion of the scene has a second alignment with a second detector of the focal plane array, the second alignment substantially matching the first alignment, and that the second bandpass filter is between the particular portion of the scene and the second detector;
      in response to determining that the particular portion of the scene has the second alignment with the second detector of the focal plane array and that the second bandpass filter is between the particular portion of the scene and the second detector, initiate storage of a second image of the scene, the second image captured while the particular portion of the scene has the second alignment with the second detector; and
      generate a multi-spectral composite image using at least the first image and the second image.

2. The image capture device of claim 1, wherein the image controller is further configured to cause a position of one or more component of the image capture device to be adjusted to generate the second alignment of the particular portion of the scene with the second detector.

3. The image capture device of claim 2, further comprising a piezoelectric device, a coil device, or a microelectromechanical system (MEMS) driver that is responsive to the image controller to adjust the position of the one or more component.

4. The image capture device of claim 2, further comprising a lens, wherein the one or more component of the image capture device comprises the filter device, the focal plane array, or the lens.

5. The image capture device of claim 4, wherein the filter device comprises a filter array, wherein the image controller is configured to cause the position of the one or more component of the image capture device to be adjusted by shifting a position of the filter array based on a physical dimension of the first bandpass filter, and wherein the first detector and the second detector are the same detector.

6. The image capture device of claim 4, wherein the filter device comprises a filter wheel, and wherein the image controller is configured to cause the position of the one or more component of the image capture device to be adjusted by rotating the filter wheel.

7. The image capture device of claim 1, wherein the first frequency range is associated with a first color, and wherein the second frequency range is associated with a second color that is different from the first color.

8. The image capture device of claim 1, wherein the image controller is further configured to:
   track a motion of the focal plane array relative to the particular portion of the scene; and
   initiate capture of the second image in response to determining, based on the motion, that the particular portion of the scene has the second alignment with the second detector.

9. The image capture device of claim 1, wherein the image controller is further configured to:
   track a motion of the focal plane array relative to the particular portion of the scene; and
   discard one or more additional images of the scene, that are captured between capture of the first image and capture of the second image, in which the particular portion of the scene is determined, based on the motion of the focal plane array, to not have the second alignment with the second detector.

10. The image capture device of claim 1, further comprising a satellite, an aircraft, or a camera, into which the filter device, the focal plane array, and the image controller are integrated.

11. A method of capturing image data, the method comprising:
   capturing, with an image capture device, a first image of a scene while a particular portion of the scene has a first alignment with a first detector of a focal plane array and a first bandpass filter is between the particular portion of the scene and the first detector;
   determining that the particular portion of the scene has a second alignment with a second detector of the focal plane array, the second alignment substantially matching the first alignment, and that a second bandpass filter having a second frequency range that is distinct from a first frequency range of the first bandpass filter is between the particular portion of the scene and the second detector;
   in response to determining that the particular portion of the scene has the second alignment with the second detector of the focal plane array and that the second bandpass filter is between the particular portion of the scene and the second detector, initiating storage of a second image of the scene, the second image captured while the particular portion of the scene has the second alignment with the second detector; and
   generating a multi-spectral composite image using at least the first image and the second image.

12. The method of claim 11, further comprising causing a position of one or more component of the image capture device to be adjusted to generate the second alignment of the particular portion of the scene with the second detector.

13. The method of claim 12, wherein the position of the one or more component of the image capture device is adjusted using a piezoelectric device, a coil device, or a microelectromechanical system (MEMS) driver.

14. The method of claim 12, wherein the one or more component of the image capture device comprises a filter device, the focal plane array, or a lens.

15. The method of claim 12, wherein adjusting the position of the one or more component of the image capture device comprises shifting a position of a filter array based on a physical dimension of the first bandpass filter or rotating a filter wheel.

16. The method of claim 11, wherein the first frequency range is associated with a first color, and wherein the second frequency range is associated with a second color that is different from the first color.

17. The method of claim 11, further comprising:
tracking a motion of the focal plane array relative to the particular portion of the scene; and
initiating capture of the second image in response to determining, based on the motion, that the particular portion of the scene has the second alignment with the second detector.

18. The method of claim 11, further comprising:
tracking a motion of the focal plane array relative to the particular portion of the scene; and
discarding one or more additional images of the scene, that are captured between capture of the first image and capture of the second image, in which the particular portion of the scene is determined, based on the motion of the focal plane array, to not have the second alignment with the second detector.

19. The method of claim 11, wherein the image capture device comprises one or more of a video camera, a picture camera, a thermal imaging camera, a microwave imager, or a radiation detector.

20. A non-transitory computer-readable storage device storing instructions that, when executed by an image controller of an image capture device, cause the image controller to perform operations comprising:
initiating capture of a first image of a scene while a particular portion of the scene has a first alignment with a first detector of a focal plane array and a first bandpass filter is between the particular portion of the scene and the first detector;
determine that the particular portion of the scene has a second alignment with a second detector of the focal plane array, the second alignment substantially matching the first alignment, and that a second bandpass filter that has a second frequency range that is distinct from a first frequency range of the first bandpass filter is between the particular portion of the scene and the second detector;
in response to determining that the particular portion of the scene has the second alignment with the second detector and that the second bandpass filter is between the particular portion of the scene and the second detector, initiating storage of a second image of the scene, the second image captured while the particular portion of the scene has the second alignment with the second detector; and
generating a multi-spectral composite image using at least the first image and the second image.

21. The non-transitory computer-readable device of claim 20, wherein the operations further include causing a position of one or more component of the image capture device to be adjusted to generate the second alignment of the particular portion of the scene with the second detector.

22. An image capture device comprising:
a filter device comprising at least a first bandpass filter having a first frequency range and a second bandpass filter having a second frequency range that is distinct from the first frequency range;
a focal plane array comprising a plurality of detectors; and
an image controller coupled to the filter device and the focal plane array, the image controller configured to:
initiate capture of a first image of a scene while a particular portion of the scene has a first alignment with a first detector of the focal plane array and the first bandpass filter is between the particular portion of the scene and the first detector;
track a motion of the focal plane array relative to the particular portion of the scene;
in response to determining that the particular portion of the scene has a second alignment with a second detector of the focal plane array, the second alignment substantially matching the first alignment, and that the second bandpass filter is between the particular portion of the scene and the second detector, initiate storage of a second image of the scene, the second image captured while the particular portion of the scene has the second alignment with the second detector;
discard one or more additional images of the scene, that are captured between capture of the first image and capture of the second image, in which the particular portion of the scene is determined, based on the motion of the focal plane array, to not have the second alignment with the second detector; and
generate a multi-spectral composite image using at least the first image and the second image.

23. A method of capturing image data, the method comprising:
capturing, with an image capture device, a first image of a scene while a particular portion of the scene has a first alignment with a first detector of a focal plane array and a first bandpass filter is between the particular portion of the scene and the first detector;
tracking a motion of the focal plane array relative to the particular portion of the scene;
in response to determining that the particular portion of the scene has a second alignment with a second detector of the focal plane array and that a second bandpass filter having a second frequency range that is distinct from a first frequency range of the first bandpass filter is between the particular portion of the scene and the second detector, initiating storage of a second image of the scene, the second image captured while the particular portion of the scene has the second alignment with the second detector;
discarding one or more additional images of the scene, that are captured between capture of the first image and capture of the second image, in which the particular portion of the scene is determined, based on the motion of the focal plane array, to not have the second alignment with the second detector; and
generating a multi-spectral composite image using at least the first image and the second image.

* * * * *

UNITED STATES PATENT AND TRADEMARK OFFICE
CERTIFICATE OF CORRECTION

PATENT NO. : 10,904,493 B2
APPLICATION NO. : 16/373174
DATED : January 26, 2021
INVENTOR(S) : Mark A. Lundgren, Friedrich Wilhelm Kunzler and Maurice Masequesmay Page 1 of 1

It is certified that error appears in the above-identified patent and that said Letters Patent is hereby corrected as shown below:

In the Claims

Column 23, Line 21, Claim 20, after "computer-readable" delete "storage".

Signed and Sealed this
Second Day of March, 2021

Drew Hirshfeld
*Performing the Functions and Duties of the
Under Secretary of Commerce for Intellectual Property and
Director of the United States Patent and Trademark Office*